United States Patent [19]

Momiyama

[11] Patent Number: 4,940,103

[45] Date of Patent: Jul. 10, 1990

[54] POWER STEERING SYSTEM FOR USE IN MOTOR VEHICLE

[75] Inventor: Fujio Momiyama, Hino, Japan

[73] Assignee: Hino Jidosha Kogyo Kabushiki Kaisha (Hino Motors, Ltd.), Tokyo, Japan

[21] Appl. No.: 412,537

[22] Filed: Sep. 22, 1989

Related U.S. Application Data

[63] Continuation of Ser. No. 108,213, Oct. 14, 1987, abandoned.

[51] Int. Cl.$^5$ .......................... B62D 5/08; B62D 6/00
[52] U.S. Cl. ..................................... 180/132; 91/371; 180/143
[58] Field of Search .............. 180/132, 143, 148, 79.3; 91/370, 371, 422, 434, 443, 463, 380, 388

[56] References Cited

U.S. PATENT DOCUMENTS 4,463,936  8/1984  Shinbori et al. ................. 180/132 X

FOREIGN PATENT DOCUMENTS

| 185369 | 10/1983 | Japan | 180/132 |
| 185370 | 10/1983 | Japan | 180/132 |
| 179455 | 10/1984 | Japan | 180/143 |
| 92959  | 5/1985  | Japan | 180/132 |
| 132468 | 6/1986  | Japan | 180/143 |
| 175176 | 8/1986  | Japan | 180/143 |

Primary Examiner—Mitchell J. Hill
Attorney, Agent, or Firm—Staas and Halsey

[57] ABSTRACT

A power steering system for use in a motor vehicle is disclosed. It comprises a power cylinder; a control valve equipped with a pair of reaction chambers; a hydraulic pump; a reaction passage intercommunicating the pair of reaction chambers, a reaction regulating valve disposed in the reaction passage, a pressure sensor sensing the oil pressure in a hydraulic circuit which is equivalent to the weight of a load, and a controller being inputted a desired value of the oil pressure of the reaction chambers corresponding to the speed, steering value, steering effort and steering effort change rate of the motor vehicle beforehand, calculating based on the signals from the pressure sensor and signals from a speed sensor and a steering value sensor, comparing the calculated value with the desired value, controlling the current flowing in an electric actuator of the reaction regulating valve, and controlling the opening degree of the reaction regulating valve so that the hydraulic fluid in the reaction chambers is in accord with the desired value inputted beforehand. Therefore, the most suitable steering power for a slip friction coefficient ($\mu$) of the road surface and for the speed of the vehicle can be obtained by sensing the slip friction coefficient ($\mu$) of the road surface without being affected by changes in the on-load weight.

6 Claims, 5 Drawing Sheets

POWER STEERING SYSTEM FOR USE IN MOTOR VEHICLE

This is a continuation of copending application Ser. No. 07/108,213 filed on 10/14/87 now abandoned.

BACKGROUND OF THE INVENTION

This invention relates to a power steering system for use in a motor vehicle, and more particularly to a load and speed sensing power steering system which is suitable for a large-sized vehicle.

In general, speed sensing power steering systems have been widely used for vehicles. However, this kind of power steering system suffers the disadvantage that, when used for a truck, the steering power was varied depending on the loads carried by the truck which often resulted in differences of the steering feeling and differences in the stability of steering operation depending on whether the truck was loaded or unloaded.

SUMMARY OF THE INVENTION

Accordingly, the object and theme of the present invention are to provide a power steering system for use in a motor vehicle in which the most suitable steering power for a slip friction coefficient ($\mu$) of the road surface and for the speed of the vehicle can be obtained by sensing the slip friction coefficient ($\mu$) of the road surface without being affected by changes in the on-load weight, i.e., a power steering system which has load sensitive characteristics and speed sensitive characteristics.

In relation to the above-mentioned object and theme, the power steering system for use in a motor vehicle according to the present invention includes a power cylinder; a control valve equipped with a pair of reaction chambers; a hydraulic pump; a reaction passage intercommunicating said pair of reaction chambers a reaction regulating valve disposed in said reaction passage; a pressure sensor for sensing the oil pressure in a hydraulic circuit which is equivalent to the weight of a load; and a controller being input with a desired value of the oil pressure of said reaction chambers corresponding to the speed, steering value, steering effort and steering effort change rate of said motor vehicle beforehand, in order to control the current flowing in an electric actuator of said reaction regulating valve in response to signals from said pressure sensor and signals from a speed sensor and a steering value sensor. The controller calculates a value, based on the signals from said pressure sensor and signals from said speed sensor and said steering value sensor, compares the calculated value with the desired value, controls a predetermined current flowing in the electric actuator of said reaction regulating valve, and controls the opening degree of said reaction regulating valve so that the hydraulic fluid in said reaction chambers is in accord with the desired value inputted beforehand. Particularly, the controller opens and shuts the reaction regulating valve according to a signal from the speed sensor and steering value sensor so as to throttle-adjust the sectional area of the reaction passage, the oil pressure of the hydraulic circuit which is equivalent to the weight of the load sensed by the pressure sensor which is equivalent to the sensed slip friction coefficient ($\mu$) of the road surface is converted to an electrical signal, the electrical signal is fed to the controller, and the reaction regulating valve is controlled by the controller so that the oil pressure in the reaction chambers are feedback controlled.

DETAILED DESCRIPTION OF THE PREFERRED EMBODIMENTS

Preferred embodiments of a power steering system for use in a motor vehicle according to the present invention will be described hereunder with reference to the accompanying drawings.

Figure 1:
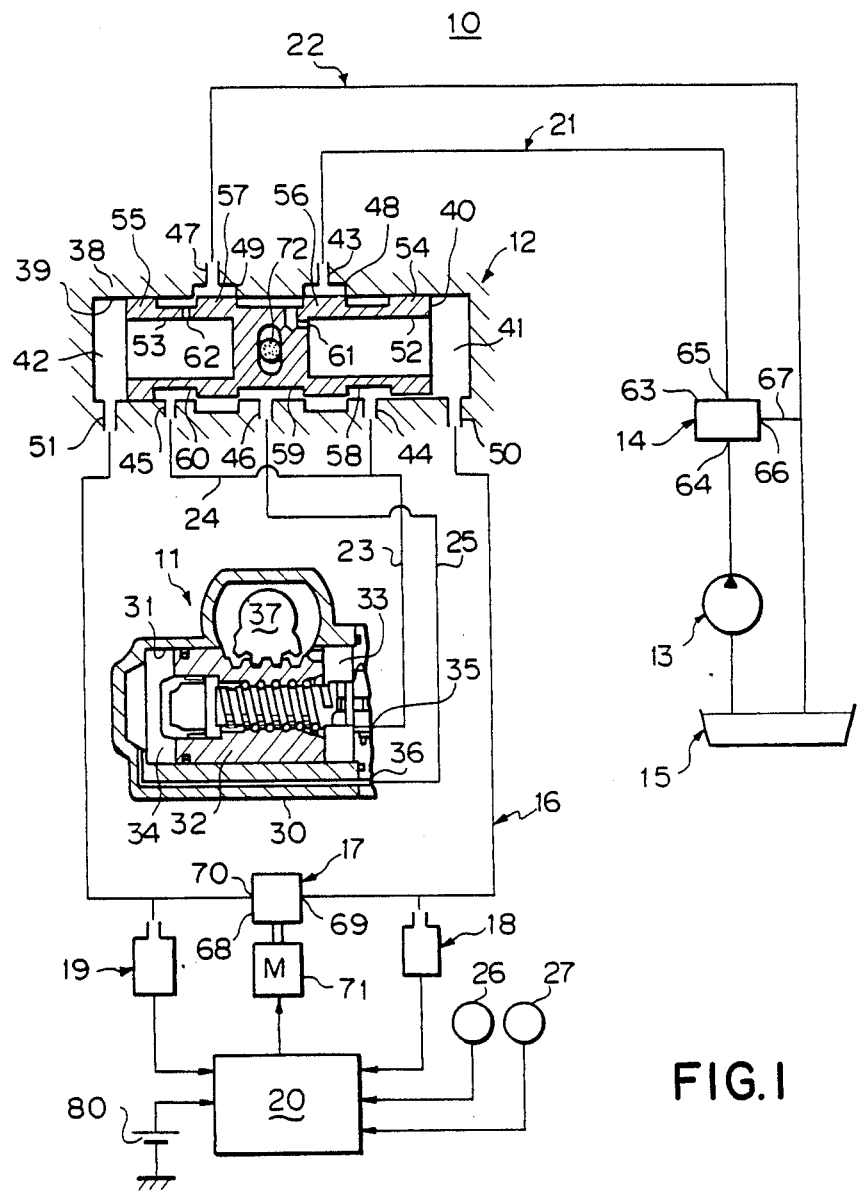
FIG. 1 is a schematic view of a power steering system for use in a motor vehicle according to one embodiment of the present invention, in which the steering system is applied to a truck.

FIG. 1 schematically illustrates a power steering system 10 used for a vehicle according to one embodiment of the present invention, in which the steering system 10 is applied to a truck.

In the power steering system 10, a control valve 12 equipped with a power cylinder 11, and a pair of reaction chambers 41, 42, a hydraulic pump 13, a flow control valve 14, an oil reservoir 15 and a relief valve (not shown) are connected to a hydraulic circuit by feed-side and return-side hydraulic fluid pipes 21 and 22. The pair of reaction chambers 41 and 42 are intercommunicated by a reaction passage 16. A reaction regulating valve 17 is disposed in the reaction passage 16. A pair of pressure sensors 18 and 19 are disposed in the reaction passage 16 in such a manner as to correspond to the reaction chambers 41 and 42 to sense the oil pressure within the reaction chambers 41 and 42. A controller 20 controls the current flowing in an electric actuator 71 (e.g. stepping motor) of the reaction regulating valve 17 in response to the signals from the pressure sensors 18 and 19 and the signals from a speed sensor 26 and a steering rate sensor 27. A pair of front wheel shafts (not shown) are swingably connected to both ends of the front axle (not shown) of the truck for steering.

The power cylinder 11 is of an integral structure which includes a steering gear box (not shown) for operating the control valve 12 and making it possible to perform a manual steering operation. The cylinder 11 is swingably connected to both ends of the front axle disposed in front of a chassis frame (not shown) of the truck through knuckles (not shown) and king pins (not shown). The cylinder 11 is also connected to the front wheel shaft which rotatably supports the front wheels through a pitman arm (not shown), a drag link (not shown) and a knuckle arm (not shown). Of course, the front wheel shafts are interconnected by a tie rod (not shown) and a tie rod arm (not shown).

The power cylinder 11 comprises a cylinder body 30 containing the control valve 12 and having a cylinder bore 31 communicating with oil ports 35 and 36 connected to cylinder ports 44, 45 and 46 of the control valve 12; a piston 32 for defining a pair of cylinder chambers 33 and 34 which are reciprocally slidably fitted into the cylinder bore 31 and connected thereto in such a manner as to correspond to the oil ports 35 and 36; and a sector shaft 37 which meshes with the piston 32 and transmits the motion of the piston 32 to the pitman arm.

The power cylinder 11 includes communicating passages 23 and 24 for intercommunicating the oil port 35 of the cylinder chamber 33 and the cylinder ports 44 and 45 of the control valve 12, and a communicating passage 25 for intercommunicating the oil port 36 of the cylinder chamber 34 and the cylinder port 46 of the control valve 12. Of course, the communicating passages 23, 24 and 25 are switch-connected to the supply side and return side hydraulic fluid pipes 21 and 22 by the control valve 12, and constitute a part of the respective supply side and return side hydraulic fluid pipes 21 and 22, which connect the power cylinder 11, the control valve 12, the hydraulic pump 13, the flow control valve 14, the oil reservoir 15 and the relief valve to the hydraulic circuit.

In such constructed power cylinder 11 as mentioned above, the power and motion of the piston 32 are transmitted to the front wheels through the sector shaft 37, the pitman arm, the drag link and the knuckle arm, thereby steering the front wheels.

The control valve 12 is a spool valve of a hydraulic fluid reaction type. The control valve 12 is mounted in the cylinder body 30. A spool 40 is connected to a spool shaft 72 secured to an input shaft (not shown) connected to a steering shaft (not shown). The valve 12 is switched by a steering wheel (not shown) secured to the steering shaft. In the hydraulic circuit, the valve 12 is disposed in the supply side hydraulic fluid pipe 21, the return hydraulic fluid pipe 22 and the communicating passages 23, 24 and 25 which connect the hydraulic pump 13 and the oil reservoir 15 to the power cylinder 11. The valve 12 controls the direction of the pressurized oil which was rate-restricted by the flow control valve 14 and supplies it to the power cylinder 11. The valve 12 further controls the direction of the pressurized oil worked in the power cylinder 11 and returns it to the oil reservoir 15 at the inlet side of the hydraulic pump 13.

The control valve 12 includes a valve body 38 having a valve bore 39, and the spool 40 reciprocally slidably disposed in the valve bore 39 and which defines a pair of reaction chambers 41 and 42 in both ends of the valve bore 39.

The valve body 38 is mounted in the cylinder body 30 of the power cylinder 11 and is provided with a pump port the, cylinder ports 44, 45 and 46, and a tank port 47 which are opened up at predetermined places.

The openings at the inner peripheries of the pump port 43 and the tank port 47 are formed of ring grooves 48 and 49, respectively.

The valve body 38 is provided with a pair of reaction ports 50 and 51 opened up in the valve body 38 and situated in the reaction chambers 41 and 42.

The spool 40 defines bores 52 and 53 which are opened up in both end faces thereof, thereby making the sizes of the reaction chambers 41 and 42 large.

The spool 40, when in the neutral position, forms lands 54 and 55 on the outer peripheries of the both ends which are situated outside of the ring grooves 48 and 49. Between the lands 54 and 55, the spool 40 forms other lands 56 and 57 opposite the ring grooves 48 and 49.

Of course, the spool 40 is formed on its outer periphery and between adjacent lands 54, 55, 56 and 57 with spool grooves 58, 59 and 60 so that the grooves 58, 59 and 60 are positioned at the cylinder ports 44, 45 and 46 when the spool 40 is in its neutral position. According to the reciprocal sliding movement of the spool 40 within the valve bore 39, the spool grooves 58, 59 and 60 make it possible to switch connect the pump port 43 to the cylinder ports 44, 45 and 46 and the cylinder ports 44, 45 and 46 to the tank port 47, respectively.

The spool 40 includes restriction ports 61 and 62 for communicating the bores 52 and 53 to the corresponding spool grooves 59 and 60.

According to the reciprocal movement of the spool 40 within the valve bore 39, the restriction ports 61 and 62 switch connect the reaction chambers 41 and 42 to the pump port 43 and tank port 47, respectively.

In the control valve 12, in order to supply the high pressure oil discharged from the hydraulic pump 13 and controll its flow rate by the flow control valve 14 to the cylinder chambers 33 and 34 of the power cylinder 11, the pump port 43 is connected to an outlet port 65 of the flow control valve 14 by the supply side hydraulic fluid pipe 21, the cylinder ports 44, 45 and 46 are connected to the oil ports 35 and 36 of the power cylinder 11 by the communicating passages 23, 24 and 25, and the tank port 47 is connected to the oil reservoir 15 by the return side hydraulic fluid pipe 22.

The hydraulic pump 13 is designed to be driven by a diesel engine (not shown) on the truck, disposed in the supply side hydraulic fluid pipe 21 of the hydraulic circuit for connecting the oil reservoir 15 to the pump port 43 of the control valve 12 in order to supply hydraulic fluid to the power cylinder 11, sucks the fluid within the oil reservoir 15 upwards and pressurizes the fluid thereby to obtain an amount of discharged hydraulic fluid which is generally in proportion to the number of rotations of the diesel engine. Of course, since the hydraulic pump 13 is the same in structure as the hydraulic pump which is used for a conventional power steering system, the description will be omitted.

In the hydraulic circuit, the flow control valve 14 is disposed in the supply side hydraulic fluid pipe 21 for connecting the control valve 12 to the hydraulic pump 13 and oil reservoir 15, and is connected to the return side hydraulic fluid pipe 22 by a control valve bypass 67.

The flow control valve 14 includes a valve casing 63 including an inlet port 64 connected to the discharge side of the hydraulic pump 13, the outlet port 65 connected to the pump port 43 of the control valve 12, a return port 66 connected to the return side hydraulic fluid pipe 22, and an oil return control spool (not shown) reciprocally slidably disposed within the valve casing 63. The flow control valve 14 controls the flow rate of the hydraulic fluid delivered to the inlet port 64, delivers a predetermined amount of fluid to the outlet port 65, and returns the excessive flow rate of the hydraulic fluid to the oil reservoir 15 from the return port 66 via the control valve bypass 67.

Of course, since the flow control valve 14 is the same in construction as the flow control valve used for a conventional power steering system, the description of the detailed structure will be omitted.

The reaction passage 16 intercommunicates the pair of reaction chambers 41 and 42 of the control valve 12.

More specifically, the reaction passage 16 is connected at one end to the reaction port 50 opened up in one of the reaction chambers 41 and at the other end with the reaction port 51 opened up in the other reaction chamber 42, respectively, to intercommunicate the reaction chambers 41 and 42.

Of course, although a pipe having a predetermined inner diameter and length is used for the reaction passage 16, the provision of such pipe is not essential. Alternatively, a hole may be formed in the valve body 38 or cylinder body 30 to attain the same purpose.

Figure 3:
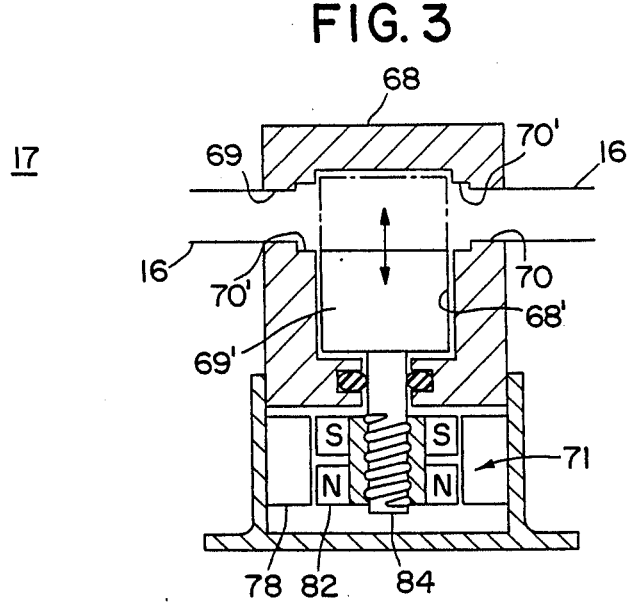
FIG. 3 is a side, cross-sectional view of a reciprocal type reaction regulating valve according to the present invention.

As shown in FIG. 3, a reaction regulating valve 17 includes a valve body 68 including a spool chamber 68' and a pair of ports 69 and 70 communicating with the spool chamber, a spool 69' reciprocally slidably disposed within the spool chamber 68' and adapted to vary the sectional dimension of a passage 70' formed between the ports 69, 70 in the spool chamber 68' according to the reciprocal sliding of the spool 69', and an electric actuator 71 for reciprocally sliding the spool 69' within the spool chamber 68'. For the purposes of sliding the spool 69', the electric actuator 71 can include a stator 78, a rotor 82 and a threaded shaft 84 provided in the valve body 68.

Therefore, the flow rate of the hydraulic fluid which flows between the ports 69 and 70 is regulated in according to the reciprocal sliding of the spool 69' within the spool chamber caused by the electric actuator 71. As a result, the internal pressure of each reaction chamber 41 and 42 of the control valve 12 is regulated.

Figure 4:
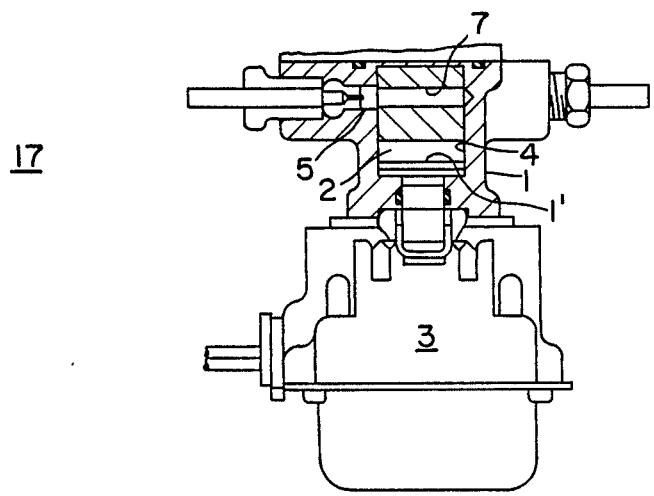
FIG. 4 is a side, cross-sectional view of a rotary type reaction regulating valve assembly according to the present invention.

Although the pressure regulating valve 17 is know as a spool type, it may be of any other type as long as it is designed to regulate the flow rate of the hydraulic fluid flowing between the ports 69 and 70. For example, it may be of a known rotary type. More particularly, as shown in FIG. 4, such a rotary type reaction regulating valve includes a valve body 1 provided with a spool chamber 4 and a pair of ports 5 and 6 communicated with the spool chamber 4, a rotary valve 2 rotably disposed within the spool chamber 4 and a stepping motor 3 for rotating the rotary valve 2 within the spool chamber 4.

Figure 2:
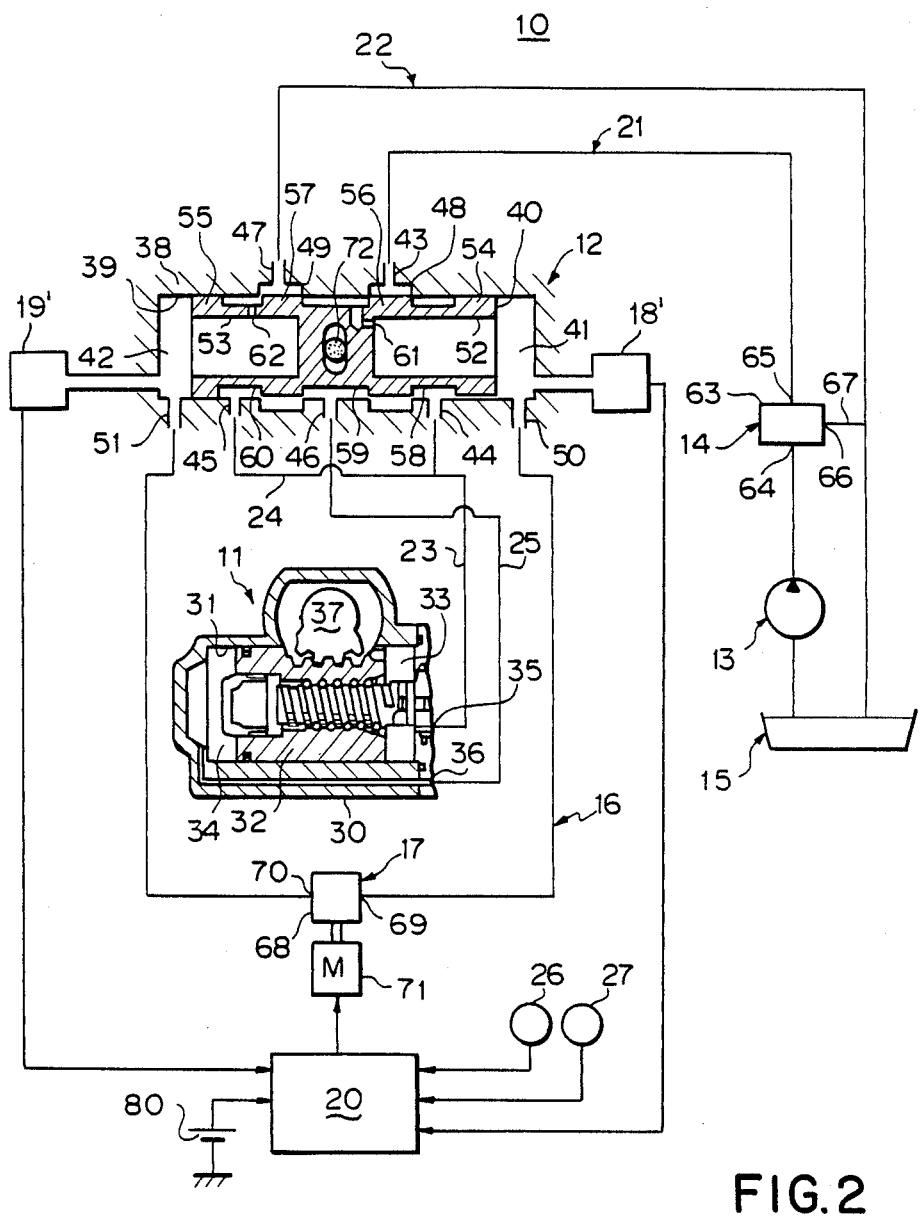
FIG. 2 is a schematic view of a power steering system for use in a motor vehicle according to another embodiment of the present invention.
Figure 5:
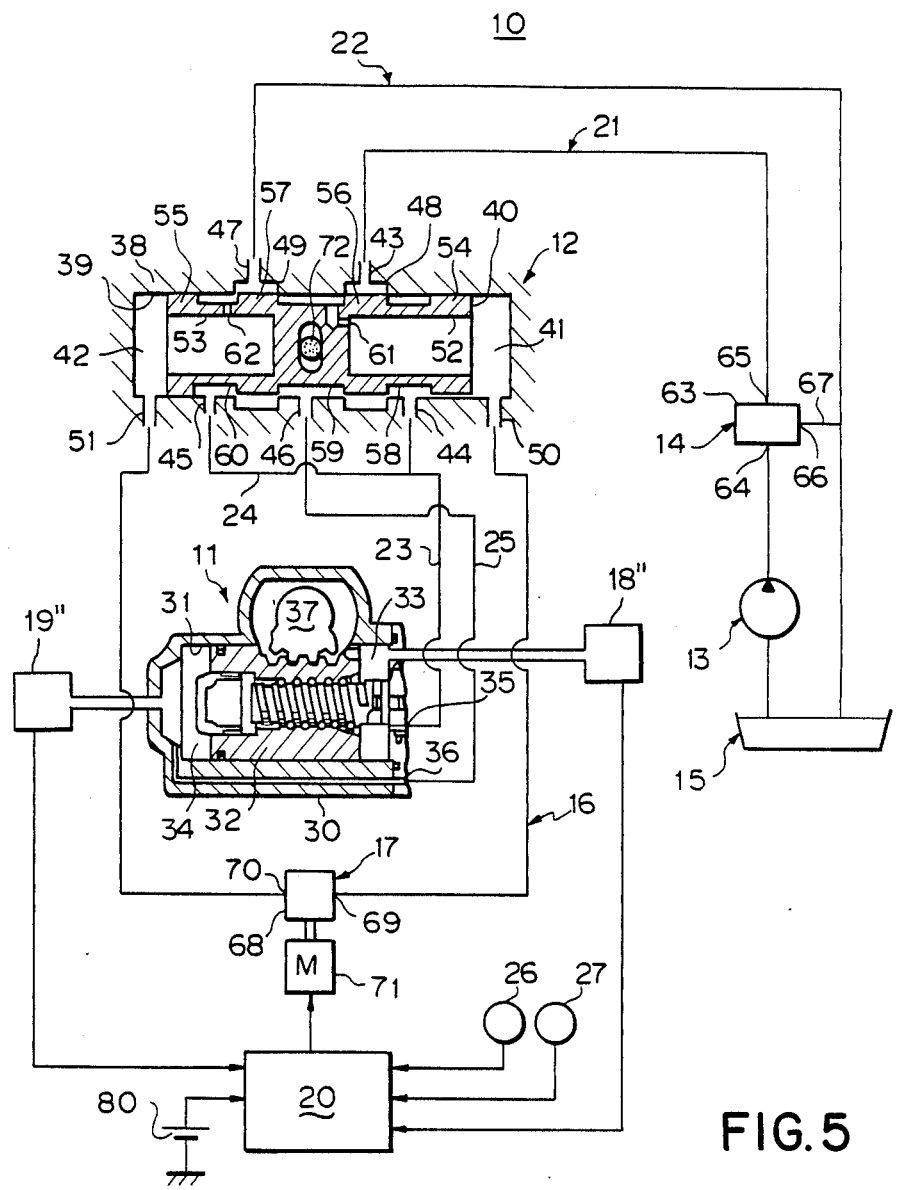
FIG. 5 is a schematic view of a power steering system for use in a motor vehicle according to another embodiment of the present invention.
Figure 6:
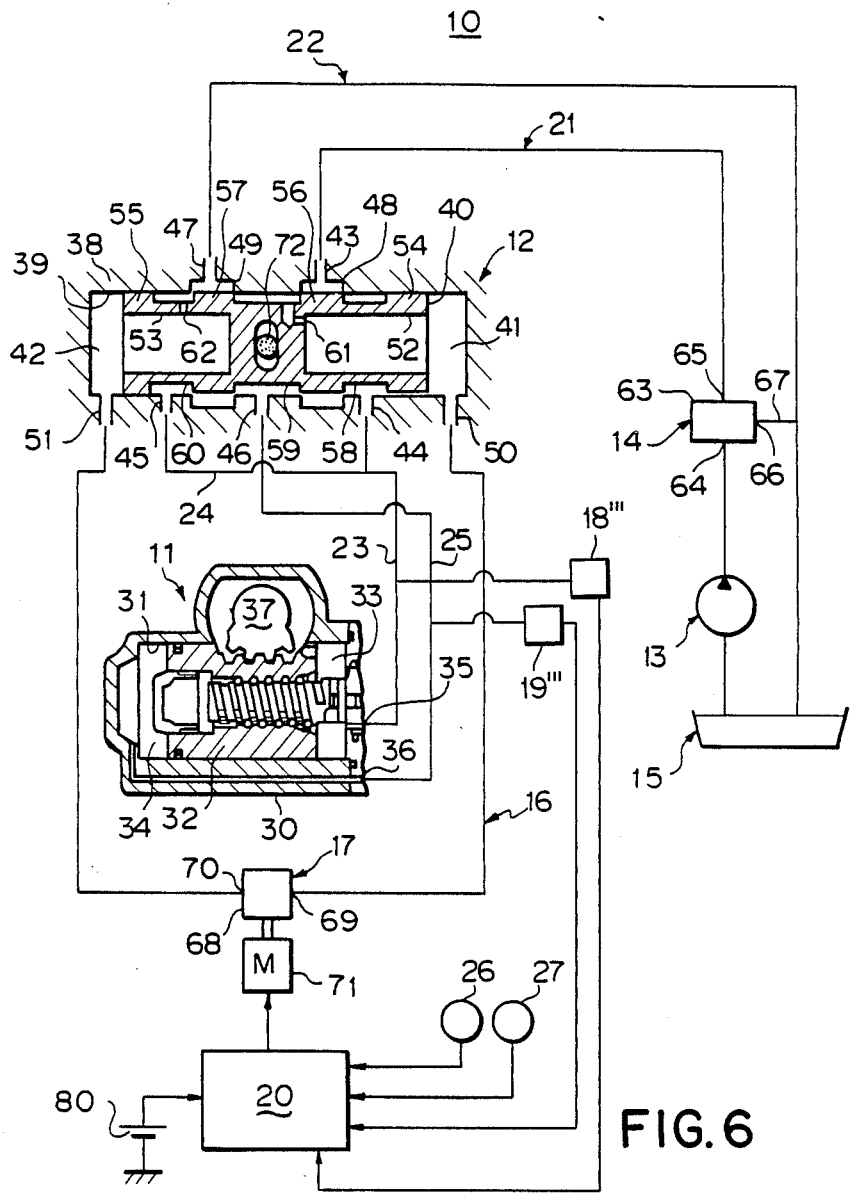
FIG. 6 is a schematic view of a power steering system for use in a motor vehicle according to still another embodiment of the present invention.

The pair of pressure sensors 18 and 19 are formed in the structure in which, as usual, the pressure is converted into an electric signal. The sensors 18 and 19 are disposed in the reaction passage 16 in such a way as to correspond to the reaction chambers 41 and 42 of the control valve 12, sense the hydraulic fluid corresponding to the slip friction coefficient ($\mu$) of the surface of the passage within the reaction chambers 41 and 42, converts it into an electric signal, and forward the signal to the controller 20. The controller 20 controls the pressure regulating valve 17 to make the hydraulic fluid in the reaction chambers 41 and 42 feedback controllable. Of course, since the pressure sensors 18 and 19 convert the hydraulic fluid of the hydraulic circuit corresponding to the slip friction coefficient ($\mu$) of the passage surface, i.e., hydraulic fluid equivalent to load corresponding to the slip friction coefficient ($\mu$) of the passage surface into an electric signal, the pressure sensors 18 and 19 may be directly disposed in the corresponding reaction chambers 41 and 42 as shown at 18', 19' in FIG. 2. Similarly, the sensors 18 and 19 may be disposed in the pair of cylinder chambers 33 and 34 of the power cylinder 11 as shown in FIG. 5; or the sensors 18 and 19 can be located in the communicating passages 23 and 25 as shown in FIG. 6. In FIGS. 2, 5 and 6, all other reference numerals refer to the same elements in FIG. 1.

The controller 20 electrically connects the input side to the pressure sensors 18 and 19, the speed sensor 26 and the steering rate sensor 27, electrically connects the output side to the electric actuator 71 of the reaction regulating valve 17, controls the current flowing in the electric actuator 71 according to signals from the pressure sensors 18 and 19, the speed sensor 26, and the steering rate sensor 27, opens and shuts the reaction regulating valve 17 and varies the sectional dimension of the passage of the reaction regulating valve 17. The controller 20 chiefly includes an output circuit, a memory circuit, an arithmetic circuit and a power source circuit. The power source circuit commonly uses the battery 80 of the truck.

Particularly, this controller 20 is inputted a desired value of the oil pressure of the reaction chambers 41 and 42 corresponding to the speed and steering value (handle angle), steering effort and steering effort change rate of the truck beforehand, calculates a value based on the signals from the pressure sensors 18 and 19, the speed sensor 26 and the steering value sensor 27, compares the calculated value with the desired value, controls the current flowing in the electric actuator 71 of the reaction regulating valve 17 and controls the opening degree of the reaction regulating valve 17 so that the hydraulic fluid of the reaction chambers 41 and 42 is in accord with the desired value inputted beforehand.

In this way, the controller 20 is designed such that a steering power fitted to the vehicle speed and steering rate can be obtained in the power steering system 10 irrespective of the changes of the load weight.

The speed sensor 26 is adapted to detect the running speed of the truck and is mounted on the output shaft of a transmission (not shown) which is mounted on the truck. The steering rate sensor 27 is a rotary sensor adapted to detect the speed of rotation, the direction of rotation, and the angle of rotation of the steering shaft and is arranged around the steering shaft in a predetermined position of the steering shaft.

Next, the action of the above-mentioned steering system 10 will be described in relation to the running state of the truck. As the hydraulic pump 13 is driven, the flow rate of the hydraulic fluid discharged from the pump 13 is controlled by the flow control valve 14, a predetermined amount of the hydraulic fluid flows in the supply side hydraulic fluid pipe 21 and is delivered to the pump port 43 of the control valve 12.

The hydraulic fluid delivered to the pump port 43 is returned to the oil reservoir 15 from the tank port 47 as shown in FIG. 1 when the spool 40 is placed in its neutral position.

Simultaneously, the controller 20 is in a position ready to input signals from the pressure sensors 18 and 19, the speed sensor 26 and the steering rate sensor 27, to control the current flowing in the electric actuator of the reaction regulating valve 17, to change the fluid pressure within the reaction chambers 41 and 42 of the control valve 12, and to operate the steering wheel, i.e., to obtain a fluid pressure reaction fitted to the weight of load and steering.

When the truck is loaded and is run at a low speed, the controller 20 inputs the signals from the pressure sensors 18 and 19, the speed sensor 26 and the steering sensor 27, calculates according to the signals inputted, compares the same with the desired value inputted beforehand, decides an output signal, i.e., output current, and flows the outputted current into the electric actuator 71 of the reaction regulating valve 17. Accordingly, the electric actuator 71 is driven, the spool is slid into the spool chamber in the reaction regulating valve 17, and the sectional dimension of the passage within the spool chamber is widened.

Therefore, when the spool 40 of the control valve 12 is slid in one direction by the steering operation, the hydraulic fluid is delivered into selected one of the cylinder chambers 33 and 34 of the power cylinder 11 and selected one of the reaction chambers 41 and 42 of the control valve 12 depending on the slid direction of the spool 40.

For example, when the spool 40 is slid rightwards in FIG. 1, the pump port 43 is connected to the cylinder port 46 through a spool groove 59 of the spool 40 and the tank port 47 is connected to the cylinder port 45 through a spool groove 60 of the spool 40, respectively. The hydraulic fluid discharged from the hydraulic pump 13 is delivered into the cylinder chamber 34 of the power cylinder 11 via the communicating passage 25, the piston 32 is slid rightwards in FIG. 1, and the hydraulic fluid in the cylinder chamber 33 of the power cylinder 33 is returned to the oil reservoir 15 via the communicating passages 23 and 24 and the return side hydraulic fluid pipe 22.

As seen, when the hydraulic fluid is supplied, a part of the hydraulic fluid is delivered into the reaction chamber 41 via the restriction port 61 and bore 52.

The reaction at the time when such steering is performed is given by the hydraulic fluid within the reaction chamber 41. As described above, since the sectional dimension of the passage 70' of the reaction regulating valve 17 is widened when the truck is running at a low speed, the hydraulic fluid in the reaction chamber 41 passes through the reaction passage 16 and flows in the other reaction chamber 42 without being excessively throttled.

Furthermore, when the spool 40 is slid in the above-mentioned direction, the tank port 47 is communicated with the spool groove 60 and the hydraulic fluid in the reaction chamber 42 is returned to the oil reservoir 15 via the return side hydraulic fluid pipe 22.

Accordingly, the pressure drop caused by the reaction regulating valve 17 becomes smaller, thereby causing the pressure difference between the left and right reaction chambers 41 and 42 to become smaller, and the hydraulic fluid in the reaction chamber 41 is no longer a large resistance against the sliding movement of the spool 40. In other words, the steering at the time when the truck is running at a low speed is performed with a small steering power.

When the spool 40 in the control valve 12 is slid leftwards in the figure, the pump port 43 is communicated with the spool groove 59, respectively, the hydraulic fluid discharged from the hydraulic pump 13 is delivered into the cylinder chamber 33 of the power cylinder 11 via the communicating passage 23, the piston is slid leftwards in the figure, and the hydraulic fluid in the cylinder chamber 34 of the power cylinder 11 is returned to the oil reservoir 15 via the communicating passage 25 and the return side hydraulic fluid pipe 22.

Contrary to the above-mentioned case, the hydraulic fluid in the reaction chamber 42 passes through the reaction passage 16 and is delivered into the reaction chamber 41 without being extremely throttled by the reaction regulating valve 17, whereas the hydraulic fluid in the reaction chamber 41 is returned to the oil reservoir 15 via the bore 52, the restriction port 61, the spool groove 59, the tank port 47 and the return side hydraulic fluid pipe 22.

Accordingly, as in the above-mentioned case, the pressure drop, caused by the reaction regulating valve 17 becomes smaller, thereby causing the pressure difference between the left and right reaction chambers 41 and 42 to become smaller, and the hydraulic fluid in the reaction chamber 42 is no longer a large resistance against the sliding movement of the spool 40. Thus, the steering is performed with a small steering power.

When the truck is running at a low speed, the pressure sensors 18 and 19 sense the hydraulic fluid in the reaction chambers 41 and 42, convert it into an electric signal, and feed it to the controller 20. The controller 20 controls the reaction regulating valve 17 and controls the feedback of the hydraulic fluid in the reaction chambers 41 and 42. Accordingly, a proper steering power can be obtained irrespective of the changes of the weight of the load on the truck and the change of steering feeling due to the load can be prevented.

When the truck is fully loaded and the running speed is zero, the sectional dimension of the passage 70' is widened to its maximum in the reaction regulating valve 17, the pressure difference between the reaction chambers 41 and 42 becomes extremely small and, as a consequence turning the wheels is performed with an extremely small steering power.

Furthermore, when the truck runs at a high speed, the controller 20 is inputted a signal from the pressure sensors 18 and 19, the vehicle speed sensor 26 and the steering power sensor 27, calculates a value according to the signal inputted, compares the same with the desired value inputted beforehand, decides an output current and flows the output current into the electric actuator 71 of the reaction regulating valve 17.

Accordingly, the electric actuator 71 is driven by the output current, in the reaction regulating valve 17, the spool 69' is slid into the spool chamber, 68' and the sectional dimension of the passage 70' in the spool chamber 68 becomes narrow, fitting to the load weight and vehicle speed.

As in the case of the afore-mentioned low speed running, if the spool 40 of the control valve 12 is slid in one direction by the steering operation, the hydraulic fluid is delivered into a selected one of the cylinder chambers 33 and 34 of the power cylinder 11 depending on the slid direction of the spool 40, the piston 32 is slid, and a part of the hydraulic fluid is delivered to a selected one of the reaction chambers 41 and 42. However, since the sectional dimension of the passage 70' in the spool chamber 68' of the reaction regulating valve 17 becomes narrow, the pressure drop caused by the reaction regulating valve 17 becomes large, the pressure difference in the left and right reaction chambers 41 and 42 becomes large and, as a consequence, the hydraulic fluid in one of the reaction chambers 41 and 42 creates a large resistance against the sliding movement of the spool 40.

In this way, a comparatively large steering power is required for steering during high speed driving and the safety of driving is improved.

Even during high speed driving, the pressure sensors 18 and 19 sense the hydraulic fluid in the reaction chambers 41 and 42, convert it into an electric signal and feed it to the controller 20. The controller 20 controls the reaction regulating valve 17 and controls the feedback of the hydraulic fluid in the reaction chambers 41 and 42. Accordingly, a steering power fitted to the weight of load loaded on the truck can be obtained, and the steering feeling and steering safety are stabilized.

Particularly, since the slip friction coefficient ($\mu$) of the road surface is sensed by allowing the pressure sensors 18 and 19 to sense the hydraulic fluid in the reaction chambers 41 and 42, the steering is performed coping with the changes of the slip friction coefficient ($\mu$) of the road surface and the driving is stabilized.

As described hereinbefore in comparison with the speed sensing power steering systems already proposed and used, the power steering system for use in a motor vehicle of the present invention includes a power cylinder, a control valve having a pair of reaction chambers, a hydraulic pump, a reaction passage intercommunicating the pair of reaction chambers, a reaction regulating valve disposed in the reaction passage, a pressure sensor for sensing the oil pressure in a hydraulic circuit which is equivalent to the weight of a load, and a controller being inputted a desired value of the oil pressure of the reaction chambers corresponding to the speed, steering value, steering effort and steering effort change rate of the motor vehicle beforehand in order to control the current flowing in an electric actuator of the reaction regulating valve in response to signals from the pressure sensor and signals from a speed sensor and a steering value sensor. Irrespective of the changes of load weight, the slip friction coefficient ($\mu$) is sensed, the most suitable steering power for the changes of the slip friction coefficient ($\mu$) of the road surface and vehicle speed is obtained. In this way, excellent load sensitive characteristics and speed sensitive characteristics are obtained, the steering feeling and steering stability are stabilized regardless of whether the truck is empty or loaded, the driver is relieved from physical and mental fatigue caused by steering, and the invention is very useful when applied to large trucks and large buses.

Although this invention has been described in its preferred form with a certain degree of particularity, it is understood that the present disclosure of the preferred form has been made only by way of example and that numerous changes in the details of construction and arrangement of parts may be restored to without departing from the spirit and the scope of the present invention as hereinafter claimed.

What is claimed is:

1. A hydraulic circuit power steering system for use in a motor vehicle, comprising:
    a power cylinder,
    a control valve provided with a pair of reaction chambers,
    a hydraulic pump,
    a reaction passage intercommunicating said pair of reaction chambers,
    a reaction regulating valve disposed in said reaction passage and including an actuator activated by electric current,
    means for sensing actual hydraulic pressure in the hydraulic circuit which is equivalent to the actual slip friction coefficient $\mu$ of the road surface and for generating a signal therefore,
    means for sensing an actual speed of the motor vehicle and for generating a signal therefore,
    means for sensing an actual steering value of the motor vehicle and for generating a signal therefore, and
    control means, in which is previously input a valve representing a desired hydraulic pressure of said reaction chambers corresponding to a particular slip friction coefficient $\mu$ of the road surface, a particular motor vehicle speed and a particular motor vehicle steering value, for calculating a value based on the signals from said hydraulic pressure sensing means, speed sensing means and said steering value sensing means, for comparing the calculated value with the desired value, controlling the current flowing to the electric actuator and for controlling said reaction regulating valve so that the hydraulic pressure in said reaction chambers is caused to correspond to the desired value.

2. A hydraulic circuit power steering system as claimed in claim 1, wherein said pressure sensing means is a pair of pressure sensors, each disposed at one of the pair of reaction chambers.

3. A hydraulic circuit power steering system as claimed in claim 1, wherein said pressure sensing means is disposed in said reaction passage.

4. A hydraulic circuit power steering system as claimed in claim 1, wherein said control valve comprises:
    a valve body having a valve bore and being provided with a pump port, a plurality of cylinder ports, and a tank port communicated with the valve bore,
    a spool reciprocally slidably disposed in the valve bore defining the pair of reaction chambers at respective ends of the valve bore, and
    a pair of restriction ports for switch-connecting the pair of reaction chambers to discharge and suction sides of the hydraulic pump.

5. A hydraulic circuit power steering system as claimed in claim 1, wherein said reaction regulating valve comprises:
    a valve body provided with a spool chamber and a pair of ports communicated with said spool chamber,
    a spool reciprocally slidably disposed within said spool chamber, and
    the electric actuator for reciprocally sliding said spool within said spool chamber.

6. A hydraulic circuit power steering system as claimed in claim 1, wherein said reaction regulating valve comprises:
    a valve body provided with a spool chamber and a pair of ports communicated with said spool chamber,
    a rotary valve rotatably disposed within said spool chamber so as to change a sectional area of a passage within said spool chamber, and
    the electric actuator for rotating said rotary valve within said spool chamber.

* * * * *